United States Patent [19]

Mizote

[11] 4,121,545
[45] Oct. 24, 1978

[54] ELECTRONIC FUEL INJECTION CONTROL APPARATUS USING VARIABLE RESISTANCE FOR RELATING INTAKE AIR SPEED TO ENGINE SPEED

[75] Inventor: Masanori Mizote, Yokosuka, Japan

[73] Assignee: Nissan Motor Company, Limited, Japan

[21] Appl. No.: 654,913

[22] Filed: Feb. 3, 1976

[30] Foreign Application Priority Data

Feb. 6, 1975 [JP] Japan ................................ 51-15812
Oct. 21, 1975 [JP] Japan ............................... 50-126503

[51] Int. Cl.² ............................................. F02B 3/00
[52] U.S. Cl. ............................ 123/32 EJ; 123/32 EA
[58] Field of Search .......... 123/32 EA, 32 ED, 32 EJ

[56] References Cited

U.S. PATENT DOCUMENTS

| | | | |
|---|---|---|---|
| 3,732,854 | 5/1973 | Murtin | 123/32 EA |
| 3,750,631 | 8/1973 | Scholl et al. | 123/32 EA |
| 3,750,632 | 8/1973 | Zechnall | 123/32 EA |
| 3,782,339 | 1/1974 | Scholl et al. | 123/32 EA |
| 3,796,198 | 3/1974 | Mauch et al. | 123/32 EA |
| 3,867,913 | 2/1975 | Pierlot | 123/32 EA |
| 3,951,113 | 4/1976 | Wessel et al. | 123/32 EA |
| 3,983,848 | 10/1976 | Handtmann et al. | 123/32 EA |
| 3,991,726 | 11/1976 | Kawai et al. | 123/32 EA |

Primary Examiner—Ronald H. Lazarus
Assistant Examiner—Andrew M. Dolinar
Attorney, Agent, or Firm—Robert E. Burns; Emmanuel J. Lobato; Bruce L. Adams

[57] ABSTRACT

An electronic fuel injection control apparatus is provided with a first sensor to determine the volume of intake air and a second sensor providing an electrical signal the magnitude of which is related to the engine speed. The detected air volume is translated into a corresponding pivotal movement. A variable resistance element is arranged to alter its value in accordance with the pivotal movement. The engine speed related signal is connected to the end terminals of the resistance element to develop a voltage representing the engine speed. The variation of the resistance value produces corresponding variation in voltage across the output terminals of the resistance. The output voltage is thus related both to the engine speed and intake air volume, and used to modulate the duration of a pulse produced per engine revolution to provide an injection control signal.

10 Claims, 10 Drawing Figures

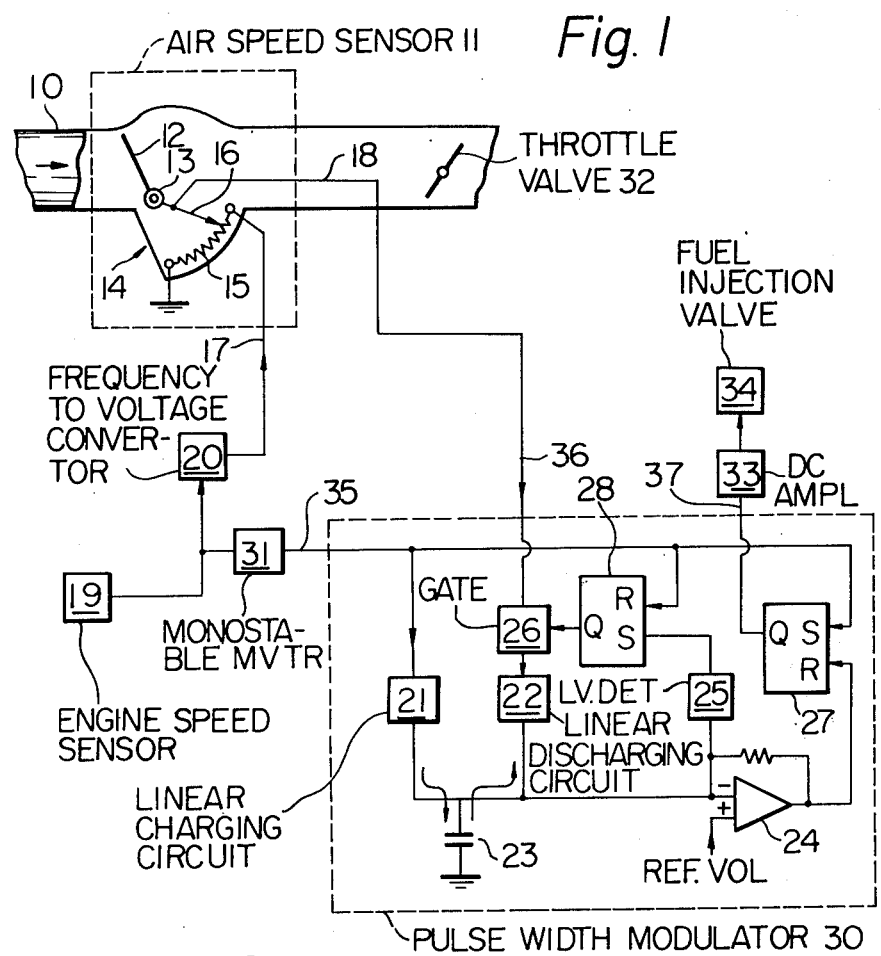

ELECTRONIC FUEL INJECTION CONTROL APPARATUS USING VARIABLE RESISTANCE FOR RELATING INTAKE AIR SPEED TO ENGINE SPEED

BACKGROUND OF THE INVENTION

The present invention relates generally to electronic fuel injection, and specifically it relates to an electromechanical control device for generating a signal related both to the volume of air inducted per cylinder cycle and the speed of the engine.

In an electronically fuel injected internal combustion engine, a predetermined number of control pulses, usually one pulse, is generated per engine revolution to activate the injection valve to supply fuel needed to provide combustion for each cylinder cycle at a desired air fuel ratio. To operate the engine at the desired air fuel ratio, it is necessary to precisely relate the amount of fuel to be injected to the volume of air contributing to the complete combustion of the fuel under all engine operating conditions. Engine operating parameters such as engine speed and intake air speed are sensed as intelligence to control the engine's air fuel ratio at the stoichiometric value. To obtain a control signal, the sensed value of engine speed is divided by the sensed value of intake air. This is conventionally achieved by feeding the sensed voltages to an electronic dividing circuit. However, engine speed tends to increase as much as four times its minimum value while the intake air volume tends to increase as much as ten times its mimimum value. Therefore, the use of the electronic dividing circuit requires a costly complicated circuitry if an accurate computation result is desired.

SUMMARY OF THE INVENTION

The primary object of the present invention is therefore to provide an improved electronic fuel injection control apparatus in which the sensed air speed and engine speed are electromechanically combined and interrelated to each other, with the consequential reduction in the number of component parts required.

In accordance with the present invention, there is provided an improved electronic fuel injection control apparatus for an internal combustion engine having an air intake passage, which comprises means sensitive to the speed of the air inducted through the air intake passage for translating the volume of air into a corresponding mechanical pivotal movement, means sensitive to the speed of the engine to produce an engine speed related signal, a variable resistance element connected to receive the signal to develop thereacross an engine speed related voltage, the resistance thereof being arranged to vary in accordance with the mechanical movement of the air speed sensitive means to modulate the developed voltage with the sensed air volume to thereby relate the output voltage across the resistance end terminals to the sensed engine speed and air volume, means for generating a control pulse per engine revolution, the pulse duration of which is variable in response to the speed related voltage, and an injection control valve operative to the generated control pulse to inject fuel to the cylinder of the engine.

BRIEF DESCRIPTION OF THE DRAWINGS

These and other objects, features and advantages of the present invention will be understood from the following description taken in conjunction with the accompanying drawings in which:

FIG. 1 is a circuit diagram of a first embodiment of the invention;

FIG. 2 is a waveform diagram useful for describing the operation of the circuit of FIG. 1;

DESCRIPTION OF THE PREFERRED EMBODIMENTS

Figure 3:
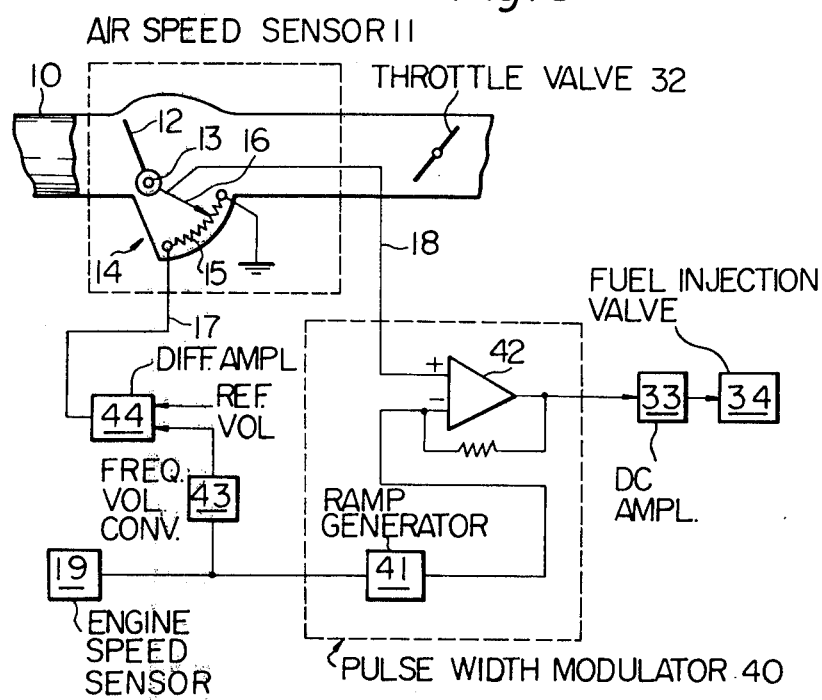
FIG. 3 is an alternative embodiment of the invention.

Referring now to the drawings wherein like parts are indicated by like numerals throughout the several views. The control system of FIG. 1 includes an intake air speed sensor 11 disposed in the passage of air intake pipe 10 of an internal combustion engine of electronic fuel injection type at the upstream side of the throttle valve 32 to measure the volume of intake air. This air speed sensor comprises a deflectable flap 12 pivoted at 13 and normally spring biased in opposition to the direction of air flow as indicated by the arrow in the drawings. The angle of deflection of deflector 12 increases in proportion to the speed of the air inducted to the passage 10 and so it can be related to the volume of air inducted per unit time for a given cross-sectional dimension of the passage 10. A potentiometer or variable resistance element 14 is provided which includes a resistance element 15 and a slidable contactor 16 pivoted at one end to the pivot 13 for unitary rotation with the deflector 12 and in electrically slidable contact with the surface of the resistor 15 at the other end. The potentiometer 14 has its input terminal 17 coupled to one end of the resistor 15 to receive an external voltage and its output terminal 18 coupled to the contactor 16 to derive an air volume indicative voltage from a movable point intermediate the ends of the resistor 15 for a given value of the external voltage. An engine speed sensor 19 is provided to produce an electrical pulse per revolution of the engine. The engine speed sensor may be of a conventional design comprising a permanent magnet rotor coupled to the engine crankshaft for unitary rotation therewith and a stator which develops an impulse as the stator intercepts the magnetic lines of flux generated by the rotor per revolution of the crankshaft, the number of pulses delivered thus representing the revolution per unit time, or speed of the engine. The output from the engine speed sensor 19 is coupled to a frequency-to-voltage converter 20 to convert the input pulses into a continuous voltage, the magnitude of which is proportional to the engine speed, and applied to the input terminal 17 of the air speed sensor 11. The potentiometer 14 develops a voltage representative of the engine speed related voltage across its end terminals.

With the increase in the speed of intake air, the angle which the deflector 12 makes relative to the axis of the intake pipe 10 increases in exact proportion. With this, the slidable contactor 16 rotates clockwise to the end terminal of the resistor 15 connected to ground. The voltage across the contactor 16 and the grounded terminal decreases with the air speed. The voltage on output lead 18 varies in proportion to the engine speed while it varies inversely proportional to the air speed.

The sensor 19 output is also connected to a monostable multivibrator 31 which stretches the duration of the speed related pulses to a predetermined value to produce constant duration pulses (FIG. 2a). The duration of these pulses is modulated in accordance with the voltage available at the output terminal 18 of air speed sensor 11 by means of a pulse width modulator 30 which includes linear charge and discharge circuits 21 and 22, a capacitor 23 associated with the circuits 21 and 22. The output from monostable multivibrator 31 is coupled to the linear charging circuit 21 on lead 35 to charge up the capacitor 23 linearly with time (FIG. 2b). When the voltage developed across the capacitor 23 reaches a predetermined voltage, a level detector 25 detects this voltage and sets a flip-flop 28 to enable a transmission gate 26 to allow the output from the air speed sensor 11 to be connected through lead 36 to the linear discharging circuit 22 which in turn allows the electrical energy stored in the capacitor 23 to be discharged linearly with time the rate of which is proportional to the voltage applied thereto. At the end of the period of monostable multivibrator 31, a flip-flop 27 is switched from the quiescent state and provides a high level output to a d.c. amplifier 33 on lead 37 to be amplified to a level required to operate a fuel injection valve 34. The capacitor 23 output is further connected to the inverting input terminal of an operational amplifier 24 the non-inverting input of which is connected to a source of reference voltage. When the capacitor voltage decreases to a level lower than the reference voltage, the operational amplifier 24 generates a signal which is coupled to the reset terminal of flip-flop 27 to switch it to the quiescent state. Therefore, rectangular pulses appear on the output lead 37 of the pulse width modulator 30 the width of which is inversely proportional to the rate of discharge and hence proportional to the air speed and inversely proportional to the engine speed (FIG. 2c). The next pulse on lead 35 resets the flip-flop 26 at the beginning of its period to the quiescent state to disable the transmission gate 26 to allow the capacitor 23 to be charged up by that pulse.

It is to be understood from the above discussion that since the voltage developed at the output of the air speed sensor 11 follows in exact relation to the movement of deflector 12, the two sensed engine parameters are accurately interrelated each other without the use of a complicated calculating circuit even when the sensed parameters vary in considerably greater ranges.

Figure 4:
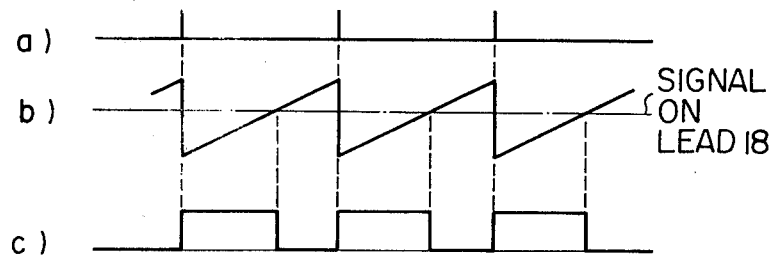
FIG. 4 is a waveform diagram useful for describing the operation of the circuit of FIG. 2.

An alternative embodiment of the invention is shown in FIG. 3 in which the engine speed sensor 19 produces a train of narrow width pulses as shown in FIG. 4a. The output from the engine speed sensor 19 is coupled to a ramp generator 41 of a pulse width modulator 40 on the one hand, and on the other hand to a frequency to voltage converter 43 which couples its output to one input of a differential amplifier 44. The differential amplifier 44 compares the input voltage with a reference voltage to provide a signal which is a difference between the two voltages and of which the magnitude varies inversely proportional to the engine speed. The engine speed signal is applied to the resistor 15 such that the voltage obtained between the contactor 16 and ground is proportional to the angle of deflection of flap 12, and hence to the air speed. Since the voltage applied to the potentiometer 14 is inversely proportional to the engine speed, the voltage appearing at the output lead 18 is proportional to the air speed and inversely proportional to the engine speed.

The pulse width modulator 40 further includes an operational amplifier 42 which receives on its non-inverting input terminal the output on lead 18 and on its inverting input the signal from the output of the ramp generator 41 which upon receipt of a pulse from the engine speed sensor 19 generates a sawtooth wave (FIG. 4b). The signal on the non-inverting input terminal serves as a reference or critical voltage with which the signal on the inverting input terminal is compared to produce an output which is amplified at 33. The fuel injection valve 34 is thus in receipt of a train of pulses the duration of which depends primarily on the voltage applied to the non-inverting input of the operational amplifier 42 (FIG. 4c), and is thus proportional to the air speed and inversely proportional to the engine speed.

Figure 5:
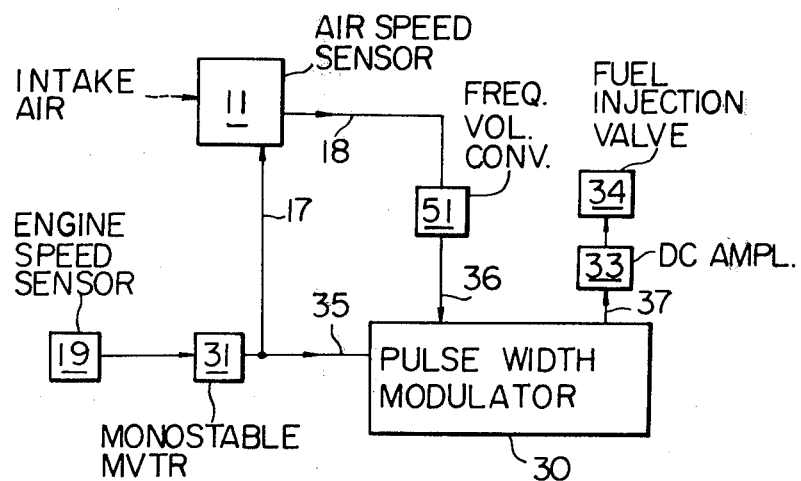
FIG. 5 is another alternative embodiment of the invention.

A modification of the FIG. 1 embodiment is shown in the circuit of FIG. 5 which is generally similar to that described in connection with FIG. 1 except that the air speed sensor 11 is in receipt of the engine speed signal in pulsed form derived from the output of monostable multivibrator 31 instead of a continuous voltage and delivers an output voltage of which the magnitude varies inversely in proportion to the air speed and the pulse repetition rate is proportional to the engine speed. The frequency-to-voltage convertor 51 is connected to the output of air speed sensor 11. The pulse width modulator 30 receives the outputs from the monostable multivibrator 31 and the frequency-to-voltage convertor 51 through its input leads 35 and 36. The same series of events will occur in the circuit of pulse width modulator 30 as that occurred in the modulator 30 of FIG. 1 in order to drive the fuel injection valve 34.

Figure 6:
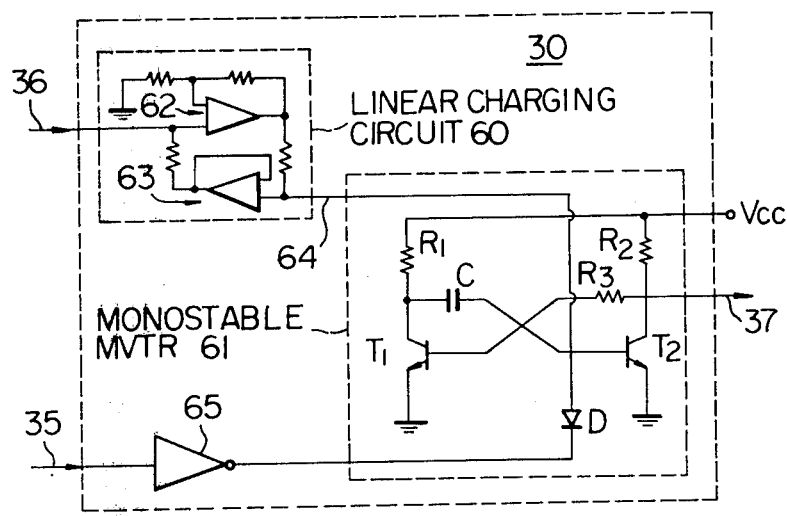
FIG. 6 is a modified form of a pulse width modulator employed in the circuit of FIG. 1.

FIG. 6 shows a modified form of the pulse width modulator 30 as employed in the embodiments of FIG. 1. The modulator 30 comprises a linear charging circuit 60 and a variable period monostable multivibrator 61. The linear charging circuit 60 comprises two operational amplifiers 62 and 63. The input lead 36 to which the output from the air speed sensor 11 is to be applied is connected to one input of a first operational amplifier 62, the output terminal of which is connected to one input terminal of the second operational amplifier 63 the output terminal of which is in turn coupled to the input lead 36, thus forming a feedback loop. The voltage at the output of the first amplifier 62 is fed back to the input thereto through the feedback loop including the second amplifier 63 so that the circuit 60 develops on its output lead 64 a voltage that charges a capacitor C of the monostable multivibrator 61 linearly with time. This monostable multivibrator is similar to those of the conventional design except that the pulse duration depends primarily on the voltage impressed on the input lead 36 that charges up the capacitor C by way of a transistor $T_1$ in its conducting state. The repetition frequency of the monostable multivibrator 61 is determined by the input pulses impressed on lead 35 which is associated with the engine speed sensor 19.

Figure 7:
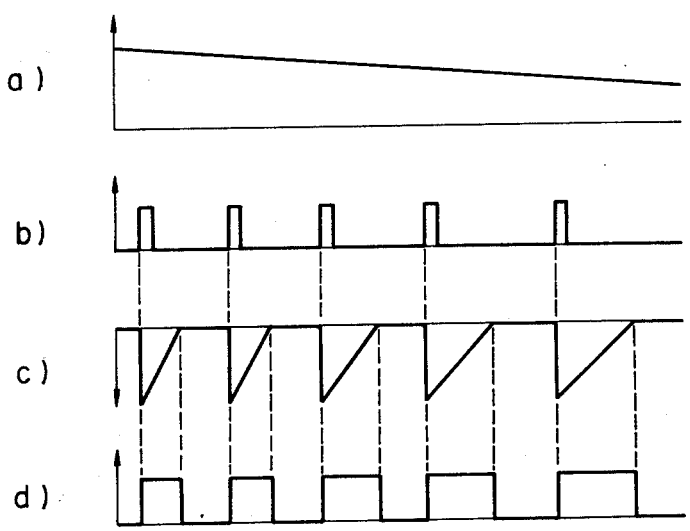
FIG. 7 is a waveform diagram useful for describing the operation of the circuit of FIG. 6.

Assume that the voltage from the output of air speed sensor 11 varies as indicated in FIG. 7a and the output from monostable multivibrator 31 occurs periodically with constant pulse duration as indicated in FIG. 7b. The signal from the monostable 31 is coupled to an invertor 65 and applied to the base electrode of transistor T₂ through diode D. At the falling edge of the output from monostable 31 the base electrode of transistor T₂ will be made negative and causes it to turn off. With the voltage at the collector of transistor T₂ at an increased potential, transistor T₁ will be turned on to charge up capacitor C through the linear charging circuit 60. The potential at the base of transistor T₂ will rise linearly with time at a rate determined by the voltage supplied to the input lead 36 (FIG. 7c). Therefore, the potential at the collector of transistor T₂ will rise sharply at the instant the input trigger pulse is applied from monostable 31 and falls sharply after the elapse of time depending on the voltage at the output of frequency-to-voltage convertor 51 (FIG. 7d). Since the voltage on lead 36 is proportional to the engine speed and inversely proportional to the air speed (FIG. 1), the duration of putput pulses is proportional to the air speed and inversely proportional to the engine speed.

Figure 8:
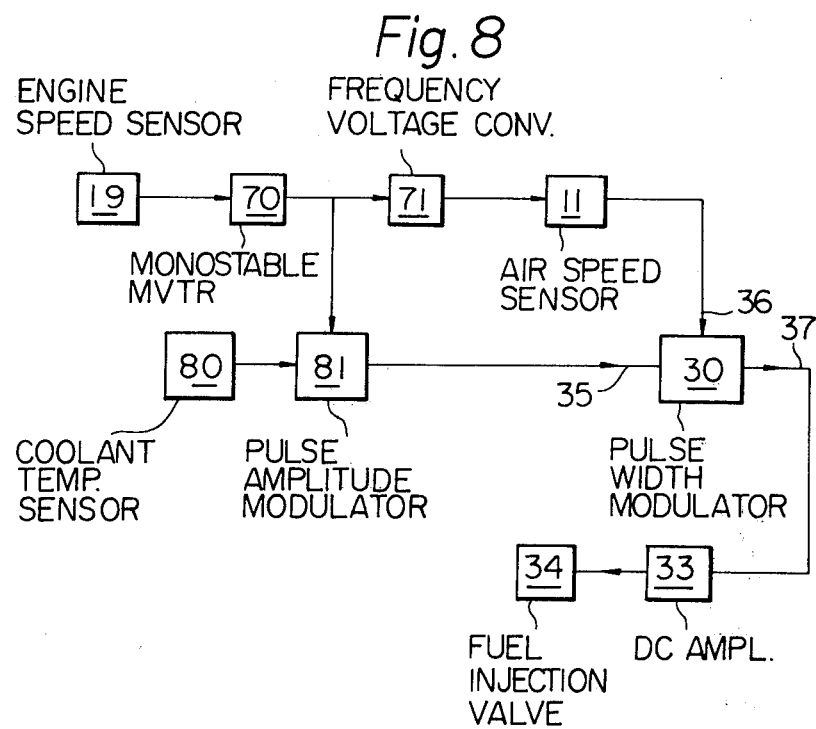
FIG. 8 is another embodiment of the invention.

FIG. 8 shows another embodiment of the invention in which the temperature of the engine is used as an input controlling parameter to increase the supply of fuel when the engine is started in inverse proportion to the engine temperature, as well as in relation to the speeds of the intake air and engine. In FIG. 8, the output from the engine speed sensor 19 is reshaped into constant duration pulses at variable intervals related to the engine speed by means of a monostable multivibrator 70 and converted into a continuous signal of the magnitude proportional to the engine speed by a frequency-to-voltage convertor 71 and applied to the air speed sensor 11 in a manner as previously described in connection with the embodiment of FIG. 1. The pulse width modulator 30 as referred to above is connected to receive the output from the air speed sensor 11 to modulate the duration of input pulses on lead 35. In the present embodiment these pulses are obtained from a pulse amplitude modulator 81 which may be of any conventional amplitude modulator and is connected to receive the output signal from a coolant temperature sensor 80 which is disposed in the water jacket of the engine to detect the coolant temperature and provides an output of which the magnitude is inversely proportional to the engine temperature. The pulse amplitude modulator 81 is also in receipt of the signal from monostable multivibrator 70 to be modulated in amplitude by the signal representative of the engine temperature.

Figure 9:
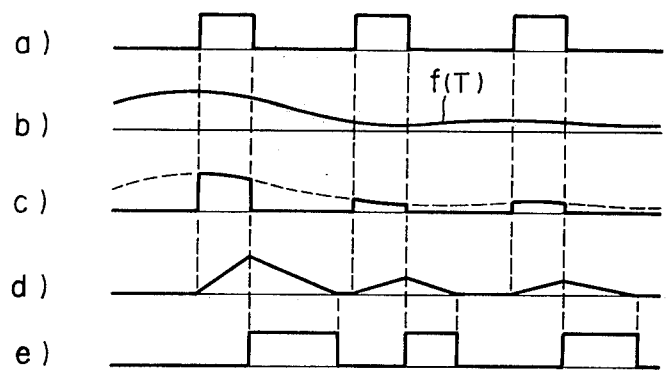
FIG. 9 is a waveform diagram useful for describing the operation of the circuit of FIG. 8.

In FIG. 9 the temperature sensor 80 is assumed to provide a signal as shown in FIG. 9b, while the monostable output occurs at substantially equal intervals (FIG. 9a), the amplitude modulator 81 provides an amplitude modulated output (FIG. 9c). This output is fed into the pulse width modulator 30 through lead 35. The capacitor 23 of the pulse width modulator 30 is charged up linearly with time during the period of the pulses on lead 35 to a level proportional to the engine coolant temperature, and discharged during the ensueing periods linearly with time at a rate proportional to the engine speed and inversely proportional to the air speed. Therefore, the time it takes to discharge the capacitor 23 is inversely proportional both to the coolant temperature and the engine speed and proportional to the speed of the intake air, so that the amount of fuel to be supplied through the injection valve 34 is related to the coolant temperature as well as to the speeds of the engine and intake air.

Figure 10:
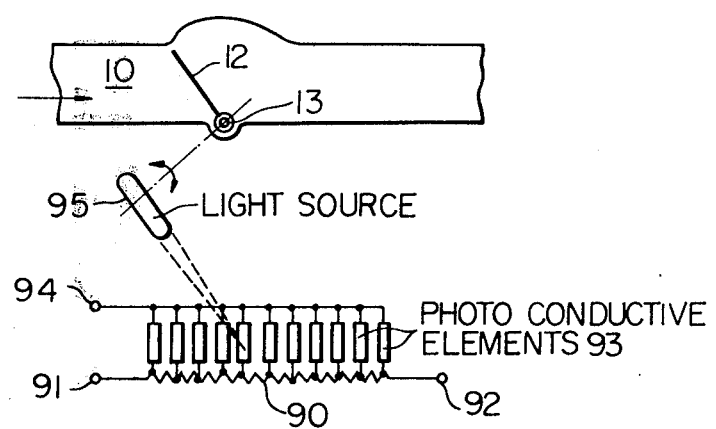
FIG. 10 is a modified form of a variable resistance element used in the circuit of FIG. 1.

FIG. 10 illustrates a modified form of the variable resistance element 14 of FIG. 1, which comprises a resistor 90 having terminals 91 and 92 at opposite ends and a plurality of photoconductive elements 93 such as cadmium sulfide (CdS). The photoconductive elements 93 have their one ends connected in common to a terminal 94 and their other ends connected to different points of the resistor 90 intermediate the terminals 91 and 92. A light source 95 is connected to the pivot 13 of the deflector 12 for unitary rotation therewith. A beam of light is directed from the source 95 to one of the photoconductive elements 93 when rotated in response to the speed of the intake air in the passage 10 to cause the illuminated photoconductive element to decrease its resistance, and as a result of which an electrical path is established between the terminal 94 and terminals 91 and 92. The resistance measured between the terminals 94 and 91 decreases with the increase in air speed, while the resistance between terminals 94 and 92 increases therewith. Therefore, one of the terminals 91 and 92 serves as the input terminal 17 of the air speed sensor 11 of FIG. 1 and the terminal 94 serves as the output terminal 18.

The foregoing description shows only preferred embodiments of the invention. Various modifications are apparent to those skilled in the art without departing from the scope of the invention which is only limited by the appended claims. Therefore, the embodiments shown and described are only illustrative, not restrictive.

What is claimed is:

1. An electronic fuel injection control apparatus for an internal combustion engine including means defining an air intake passage, a throttle valve therein and a fuel injector for discharging fuel to the cylinder of said engine in response to an injection pulse applied thereto, comprising:
   means disposed upstream of the throttle valve and sensitive to the speed of air inducted through said air intake passage for translating the volume of air inducted per unit time into a corresponding mechanical movement;
   means sensitive to the speed of the engine to produce an engine speed related electrical signal;
   a resistance element connected to receive said electrical signal to develop thereacross an engine speed related voltage;
   a contactor movable with said means sensitive to said air volume and in electrical slidable contact with said resistance element to extract a variable fraction of said voltage therefrom depending upon said mechanical movement, whereby the extracted voltage fraction is a modulation of said engine speed related voltage in accordance with said sensed air volume; and
   means for generating an injection pulse per revolution of the engine the pulse duration of which is variable in accordance with said modulated voltage.

2. An electronic fuel injection control apparatus as claimed in claim 1, wherein said means sensitive to said air speed comprises a deflector pivotally mounted in said air intake passage and means for biasing the deflector in a direction opposite to the direction of movement of the air through said air intake passage.

3. An electronic fuel injection control apparatus as claimed in claim 1, wherein said engine speed sensitive means comprises means for translating the speed of the engine into a train of electrical pulses, the number of said pulses being proportional to the engine speed, and means for converting the pulses into a continuous electrical signal of which the magnitude is proportional to the number of said pulses.

4. An electronic fuel injection control apparatus as claimed in claim 3, wherein said injection pulse generating means comprises means for generating constant duration pulses of which the number of pulses per unit period of time is related to the engine speed, a pulse width modulator including a storage capacitor, a linear charging circuit connected to charge the capacitor during the period of said constant duration pulses and a linear discharging circuit connected to discharge the capacitor at a rate proportional to the output voltage from said variable resistance element to thereby produce said injection pulse when the capacitor is discharged.

5. An electronic fuel injection control apparatus as claimed in claim 1, wherein said engine speed sensitive means comprises means for translating the speed of the engine into a train of pulses, the number of said pulses being proportional to the engine speed, and means for converting said pulses into a continuous signal of which the magnitude is inversely proportional to the number of said pulses.

6. An electronic fuel injection control apparatus as claimed in claim 5, wherein said injection pulse generating means comprises means for generating pulses of which the number of pulses per unit period of time is proportional to the engine speed, a pulse width modulator including a ramp generator responsive to the generated pulses to produce a sawtooth wave signal and a comparator connected to compare the voltage of the sawtooth wave signal and the output voltage from said resistance element to produce a signal which is a difference between the two voltages to thereby produce said injection pulse in accordance with said difference signal.

7. An electronic fuel injection control apparatus as claimed in claim 1, wherein said engine speed sensitive means comprises means for translating the speed of the engine into a train of pulses, the number of said pulses being proportional to the engine speed, a monostable multivibrator connected to the translating means to produce a train of constant duration pulses, means coupling said constant duration pulses to said resistance element, and means for converting the output from the resistance element into a continuous voltage signal.

8. An electronic fuel injection control apparatus as claimed in claim 7, wherein said injection pulse generating means comprises a pulse width modulator including a storage capacitor, a linear charging circuit connected to charge the capacitor during the period of said constant duration pulses and a linear discharging circuit connected to discharge the capacitor at a rate proportional to the voltage of said continuous signal from said resistance element to thereby produce said injection pulse when the capacitor is discharged.

9. An electronic fuel injection control apparatus as claimed in claim 1, wherein said injection pulse generating means comprises means for generating a train of pulses of which the number of pulses per unit period of time is proportional to the engine speed, a pulse width modulator including a variable period monostable multivibrator having a pair of first and second transistors with each having its base electrode connected to the collector electrode of the other transistor, the base electrode of the second transistor being connected to the collector of the first transistor via a storage capacitor, and a linear charging circuit having its input terminal connected to the output of said resistance element and its output terminal connected to a point intermediate said storage capacitor of the monostable multivibrator and the base electrode of the second transistor to charge said capacitor with electrons through the first transistor until the potential at the base electrode of the second transistor reaches a level which causes same to conduct, the base electrode of the second transistor being connected to receive said engine speed proportional pulses to trigger said second transistor to discharge electrons from said capacitor, whereby said injection pulses are obtained at the collector of said second transistor.

10. An electronic fuel injection control apparatus as claimed in claim 1, further comprising means sensitive to the temperature of the engine to produce an electrical signal the magnitude of which is related to the temperature of the engine, and wherein said pulse generating means is connected to receive said temperature related signal to cause the duration of said injection pulses to vary in accordance therewith.

* * * * *